(12) United States Patent
Sato et al.

(10) Patent No.: US 10,673,233 B2
(45) Date of Patent: Jun. 2, 2020

(54) CONTROL DEVICE, DISTRIBUTION BOARD, AND CONTROL METHOD

(71) Applicant: KYOCERA CORPORATION, Kyoto-shi, Kyoto (JP)

(72) Inventors: Hirotaka Sato, Yokohama (JP); Takashi Inoue, Zama (JP); Kazutaka Nakamura, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 126 days.

(21) Appl. No.: 14/905,277

(22) PCT Filed: Jul. 11, 2014

(86) PCT No.: PCT/JP2014/068604
§ 371 (c)(1),
(2) Date: Jan. 14, 2016

(87) PCT Pub. No.: WO2015/008707
PCT Pub. Date: Jan. 22, 2015

(65) Prior Publication Data
US 2016/0164286 A1 Jun. 9, 2016

(30) Foreign Application Priority Data
Jul. 17, 2013 (JP) .................................. 2013-148918

(51) Int. Cl.
*H02J 3/00* (2006.01)
*H02J 13/00* (2006.01)
(Continued)

(52) U.S. Cl.
CPC ............... *H02J 3/00* (2013.01); *G05B 15/02* (2013.01); *H02J 3/32* (2013.01); *H02J 3/383* (2013.01);
(Continued)

(58) Field of Classification Search
CPC ........................................................ H02J 3/00
See application file for complete search history.

(56) References Cited

U.S. PATENT DOCUMENTS

2005/0040809 A1* 2/2005 Uber, III .............. G01R 15/142
324/117 R
2012/0043813 A1 2/2012 Doi et al.
(Continued)

FOREIGN PATENT DOCUMENTS

EP 2 479 863 A1 7/2012
EP 2 498 364 A1 9/2012
(Continued)

OTHER PUBLICATIONS

International Search Report and Written Opinion of the International Searching Authority issued by the Japanese Patent Office for International Application No. PCT/JP2014/068604.
Extended European Search Report dated Feb. 23, 2017 issued by the European Patent Office in counterpart European Patent Patent Application No. 14 82 5837.9.

*Primary Examiner* — Tejal Gami
(74) *Attorney, Agent, or Firm* — Procopio Cory Hargreaves and Savitch LLP

(57) ABSTRACT

A panelboard (200) has a plurality of branches for branching a grid power line (30) into a plurality of home power lines (40). A home energy management system (HEMS) (300) is provided with a home communication unit (310) for receiving branch information, which is information on the plurality of branches, from the panelboard (200).

19 Claims, 6 Drawing Sheets

(51) Int. Cl.
  *H02J 3/38* (2006.01)
  *H02J 3/32* (2006.01)
  *G05B 15/02* (2006.01)

(52) U.S. Cl.
  CPC .......... *H02J 3/387* (2013.01); *H02J 13/0062* (2013.01); *H02J 13/0075* (2013.01); *Y02B 10/14* (2013.01); *Y02B 70/3216* (2013.01); *Y02B 90/222* (2013.01); *Y02B 90/2638* (2013.01); *Y02B 90/2653* (2013.01); *Y02E 10/563* (2013.01); *Y02E 10/566* (2013.01); *Y02E 40/72* (2013.01); *Y02E 60/722* (2013.01); *Y02E 60/7838* (2013.01); *Y02E 60/7853* (2013.01); *Y02E 70/30* (2013.01); *Y04S 10/12* (2013.01); *Y04S 10/123* (2013.01); *Y04S 10/14* (2013.01); *Y04S 20/12* (2013.01); *Y04S 20/221* (2013.01); *Y04S 40/124* (2013.01); *Y04S 40/126* (2013.01)

(56) References Cited

U.S. PATENT DOCUMENTS

2014/0049053 A1  2/2014  Inoue
2014/0300187 A1  10/2014  Kojima

FOREIGN PATENT DOCUMENTS

| EP | 2 701 264 A1 | 2/2014 |
| JP | 2008-182861 A | 8/2008 |
| JP | 2008-228516 A | 9/2008 |
| JP | 2008-278569 A | 11/2008 |
| JP | 2010-128810 A | 6/2010 |
| JP | 2010-200589 A | 9/2010 |
| JP | 2013-031271 A | 2/2013 |
| WO | 2008/065904 A1 | 6/2008 |
| WO | 2012/144473 A1 | 10/2012 |
| WO | 2013/061826 A1 | 5/2013 |

\* cited by examiner

CONTROL DEVICE, DISTRIBUTION BOARD, AND CONTROL METHOD

TECHNICAL FIELD

The present invention relates to a control method of controlling power in a consumer's facility and relates also to a control device using the same and a distribution board.

BACKGROUND ART

In recent years, a control system (EMS: Energy Management System) to control a plurality of equipment provided in a consumer's facility draws attention (Patent Literature 1, for example). In such a control system, a control device that controls the plurality of equipment is provided.

The control device may include HEMS (Home Energy Management System) provided in a house, BEMS (Building Energy Management System) provided in a building, FEMS (Factory Energy Management System) provided in a factory, and SEMS (Store Energy Management System) provided in a shop, for example.

CITATION LIST

Patent Literature

Patent Literature 1: Japanese Application Publication No. 2010-128810

SUMMARY OF INVENTION

When a grid is regarded as upstream, an upstream power line is branched, on a distribution board, into a plurality of downstream power lines. In other words, the distribution board has a branch for branching the upstream power line into a plurality of downstream power lines.

In the above-described control system, a technology of controlling equipment connected to the downstream power line by a control device mainly draws attention, and the power is managed by controlling equipment. Thus, it may suffice that the power is managed by controlling equipment; however, the accuracy for the power management requires further improvement.

Therefore, the present invention has been made to address the above-described problem, and an object thereof is to provide a distribution board, a control device, and a control method, with which it is possible to further improve the accuracy for a power management through a mutual cooperation upon managing the power by controlling equipment.

A control device according to the first aspect of the present invention controls power in a consumer's facility. The control device includes a receiver that receives, from a distribution board having a plurality of branches for branching an upstream power line into a plurality of downstream power lines, branch information that is information on the plurality of branches, a controller that controls power in the consumer's facility according to the branch information.

In the first aspect, the branch information is information indicating a class of voltage of the upstream power line.

In the first aspect, the branch information is information indicating a rating capacity set to the distribution board.

In the first aspect, the upstream power line includes a plurality of power lines. The downstream power line is connected to at least a part of the plurality of power lines. The branch information is information indicating an upstream power line to which a downstream power line obtained by being branched by each of the branches is connected.

In the first aspect, the branch information is information indicating the number of the plurality of branches.

In the first aspect, the branch information is information indicating the number of branches in a used condition.

In the first aspect, the branch information is information indicating a branch in a used condition.

In the first aspect, the branch information is information indicating a branch in a non-used condition.

In the first aspect, the branch information is information indicating whether there is a branch that branches an upstream powerline into a downstream power line connected to a distributed power source.

In the first aspect, the branch information is information indicating a branch that branches the upstream power line into a downstream power line connected to a distributed power source, out of the plurality of branches.

In the first aspect, the receiver receives the branch information at a timing at which power is restored from a power failure.

In the first aspect, when the upstream power line is disconnected, the receiver receives the branch information indicating that, for all the plurality of branches, the branches are in anon-used condition.

In the first aspect, when the downstream power line is disconnected, the receiver receives the branch information indicating that, for a branch that branches the upstream power line into the disconnected downstream power line, the branch is in anon-used condition.

In the first aspect, the controller requests the distribution board to transmit a current value or a power value of a downstream power line obtained by being branched by a branch in a used condition.

In the first aspect, the controller requests the distribution board to disconnect a downstream power line connected to a branch in a used condition.

A distribution board according to the second aspect of the present invention has a plurality of branches for branching an upstream power line into a plurality of downstream power lines. The distribution board includes a transmission unit that transmits branch information that is information on the plurality of branches, to a control device that controls power in a consumer's facility.

A control method according to the third aspect of the present invention is used in a control system including a distribution board having a plurality of branches for branching an upstream power line into a plurality of downstream power lines and a control device that controls power in a consumer's facility. The control method includes a step A of transmitting branch information that is information on the plurality of branches, to the control device from the distribution board, and a step B of controlling, by the control device, power in the consumer's facility according to the branch information.

DESCRIPTION OF EMBODIMENTS

Figure 1:
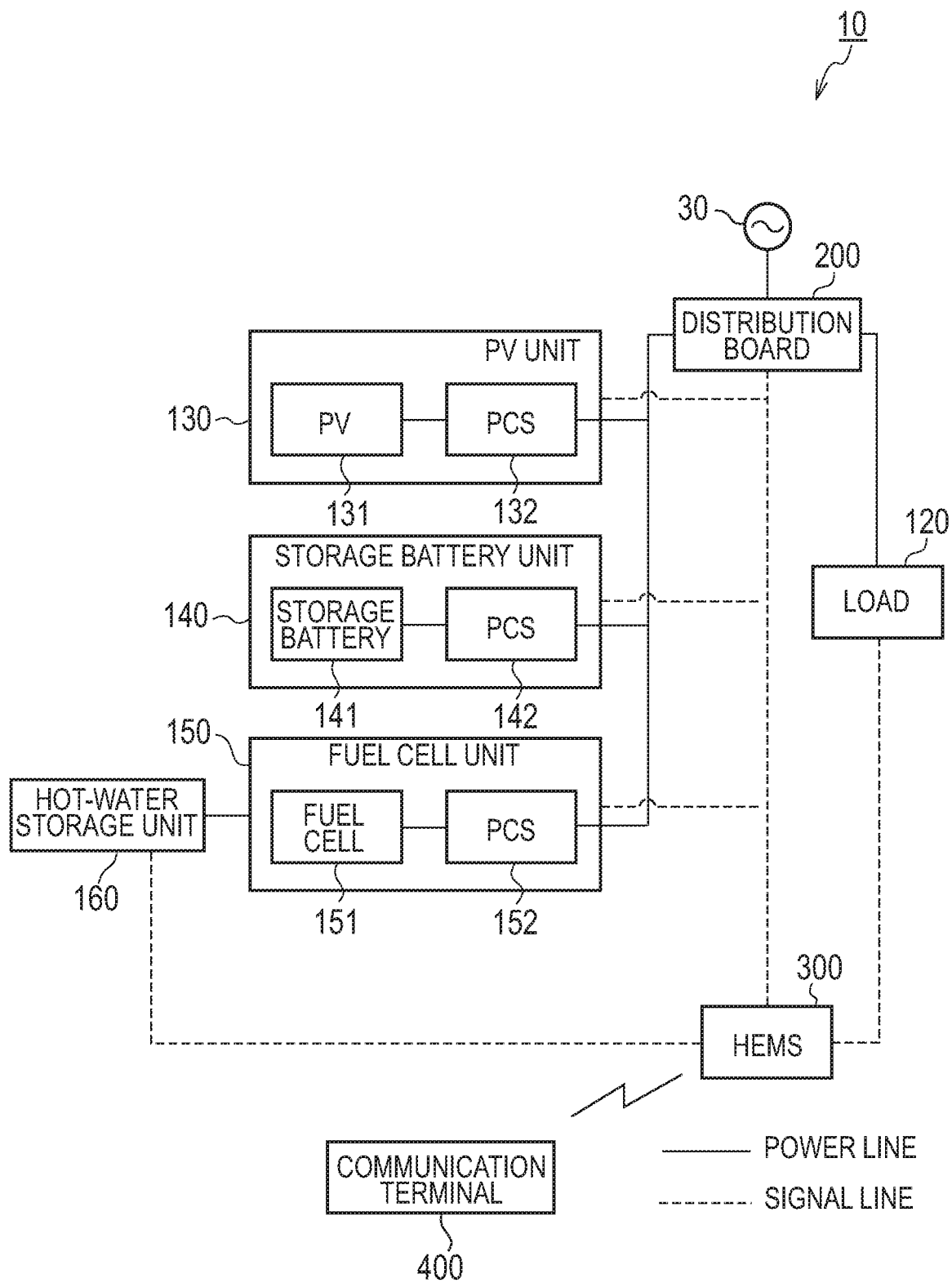
FIG. 1 is a diagram showing a consumer's facility 10 according to a first embodiment.

A control system and a control method according to an embodiment of the present invention will be described with reference to the accompanying drawings, below. It is noted that, in the following description of the drawings, the same and similar parts will be denoted by the same and similar reference numerals.

However, it should be noted that the drawings are schematically shown and the ratio and the like of each dimension are different from the real ones. Accordingly, specific dimensions, etc., should be determined in consideration of the explanation below. Further, it is needless to say that relations and ratios among the respective dimensions may differ among the diagrams.

[Overview of Embodiment]

The control device according to the embodiment controls power in a consumer's facility. The control device includes a receiver that receives, from a distribution board having a plurality of branches for branching an upstream power line into a plurality of downstream power lines, branch information that is information on the plurality of branches; and a controller that controls power in the consumer's facility according to the branch information.

In the embodiment, as a result of receiving from the distribution board the branch information that is information on the plurality of branches, the control device is capable of comprehending a state of the distribution board according to the branch information. Thus, it is possible to present the state of the distribution board to a user. Alternatively, it is possible to manage appropriately the power in the consumer's facility. In this way, it is possible to further improve the accuracy for a power management through a mutual cooperation upon managing the power by controlling equipment.

First Embodiment (Control System)

The control system according to a first embodiment will be described, below. FIG. 1 is a diagram showing the control system according to the first embodiment. In the first embodiment, the control system is provided in a consumer's facility 10.

It is noted that the consumer's facility 10 may be a detached house, a housing complex such as an apartment house, a business facility such as an office building, a factory, or a shop, for example.

As shown in FIG. 1, the consumer's facility 10 includes a load 120, a PV unit 130, a storage battery unit 140, a fuel cell unit 150, and a hot-water storage unit 160. The consumer's facility 10 has a distribution board 200 that branches a grid power line 30, and an HEMS 300 that controls the power in the consumer's facility 10. The consumer's facility 10 may have a communication terminal 400 in which an application for collecting various types of information from the HEMS 300 is installed.

The load 120 is a device that consumes the power supplied via a power line. Examples of the load 120 include a device such as a refrigerator, a lighting unit, an air conditioner, and TV. The load 120 may be a singular device, and may include a plurality of devices.

The PV unit 130 includes a PV 131 and a PCS 132. The PV 131 is an example of a distributed power source, and is a solar light power generator (Photovoltaic device) which generates power in response to reception of solar light. The PV 131 outputs the generated DC power. An amount of power to be generated by the PV 131 varies depending on the solar radiation entering the PV 131. The PCS 132 is a device (Power Conditioning System) that converts the DC power output from the PV 131, into AC power. The PCS 132 outputs the AC power to the distribution board 200 via a power line. The PCS 132 may convert theca power input from the grid power line 30 or the fuel cell unit 150, into the DC power.

The PV unit 130 may include a pyranometer which measures the solar radiation entering the PV 131.

The PV unit 130 is controlled by an MPPT (Maximum PowerPoint Tracking) method. In particular, the PV unit 130 optimizes an operation point (point determined by an operation-point voltage value and a power value, or a point determined by an operation-point voltage value and a current value) of the PV 131.

The storage battery unit 140 has a storage battery 141 and a PCS 142. The storage battery 141 is an example of the distributed power source and a device in which the power is stored. The PCS 142 is a device (Power Conditioning System) which converts the DC power output from the storage battery 141 into the AC power.

The fuel cell unit 150 has a fuel cell 151 and a PCS 152. The fuel cell 151 is an example of the distributed power source, and is advice which utilizes the fuel gas to generate power. The PCS 152 is a device (Power Conditioning System) which converts the DC power output from the fuel cell 151, into AC power.

The fuel cell unit 150 is operated by load following control. In particular, the fuel cell unit 150 controls the fuel cell 151 so that the power output from the fuel cell 151 follows the power consumed by the load 120.

The hot-water storage unit 160 is a device in which the heat, into which the power is converted, is stored. Specifically, the hot-water storage unit 160 has a hot-water storage tank where the water supplied from the hot-water storage tank is warmed by the heat exhausted by operating (power generation by) the fuel cell 151. In particular, the hot-water storage unit 160 warms the water supplied from the hot-water storage tank and feeds the warmed water back to the hot-water storage tank. Further, the hot-water storage unit 160 has a back-up heat source, and warms the water in the hot-water storage tank by operating the back-up heat source when the water is not sufficient. The heat in the back-up heat source is generated by power or gas.

The distribution board 200 is connected to the grid power line 30, and branches the grid power line 30 into a plurality of indoor powerlines. The distribution board 200 is connected, via the indoor powerline, to the load 120, the PV unit 130, the storage battery unit 140, and the fuel cell unit 150.

The HEMS 300 controls the power in the consumer's facility 10, as described above. Specifically, the HEMS 300 is connected, via a signal line, to the load 120, the PV unit 130, the storage battery unit 140, the fuel cell unit 150, and the hot-water storage unit 160, and controls the load 120, the PV unit 130, the storage battery unit 140, the fuel cell unit 150, and the hot-water storage unit 160. Further, the HEMS 300 may control an operation mode of the load 120 to control the power consumption of the load 120. The signal line for connecting the HEMS 300 and the equipment may be wireless or wired.

In the first embodiment, the HEMS 300 is connected via the signal line to the distribution board 200, and collects various types of information from the distribution board 200. The signal line for connecting the HEMS 300 and the distribution board 200 may be wireless or wired.

The HEMS 300 is connected via an outdoor communication network (a wide area communication network and a mobile communication network, for example) to various types of servers. The various types of servers store information such as a purchase unit price of power supplied from a grid, a sales unit price of the power reversely flown from the PV unit 130 to the grid, and a purchase unit price of fuel gas (hereinafter, energy rate information), for example.

Alternatively, the various types of servers store information for predicting the power consumption of the load 120 (hereinafter, energy consumption prediction information), for example. The energy consumption prediction information may be generated on the basis of an actual value of the power consumption of the load 120 in the past, for example. Alternatively, the energy consumption prediction information may be a model of the power consumption of the load 120.

Alternatively, the various types of servers store information for predicting an amount of power generated by the PV 131 (hereinafter, PV-power-generation-amount prediction information), for example. The PV-power-generation prediction information may be a predicted value of a solar radiation entering the PV 131. Alternatively, the PV-power-generation prediction information may be a weather forecast, a season, and hours of sunlight, for example.

In the communication terminal 400, an application for collecting various types of information from the HEMS 300 is installed, as described above. The application may have a function of transmitting various types of instructions to the HEMS 300. The communication terminal 400 may be a smart phone, a tablet, and a personal computer, for example. The communication terminal 400 is connected via a router provided in the consumer's facility 10, to the HEMS 300. The communication terminal 400 may be connected by wire to the HEMS 300, and may be connected wirelessly to the HEMS300.

(Configuration of Distribution Board)

Figure 2:
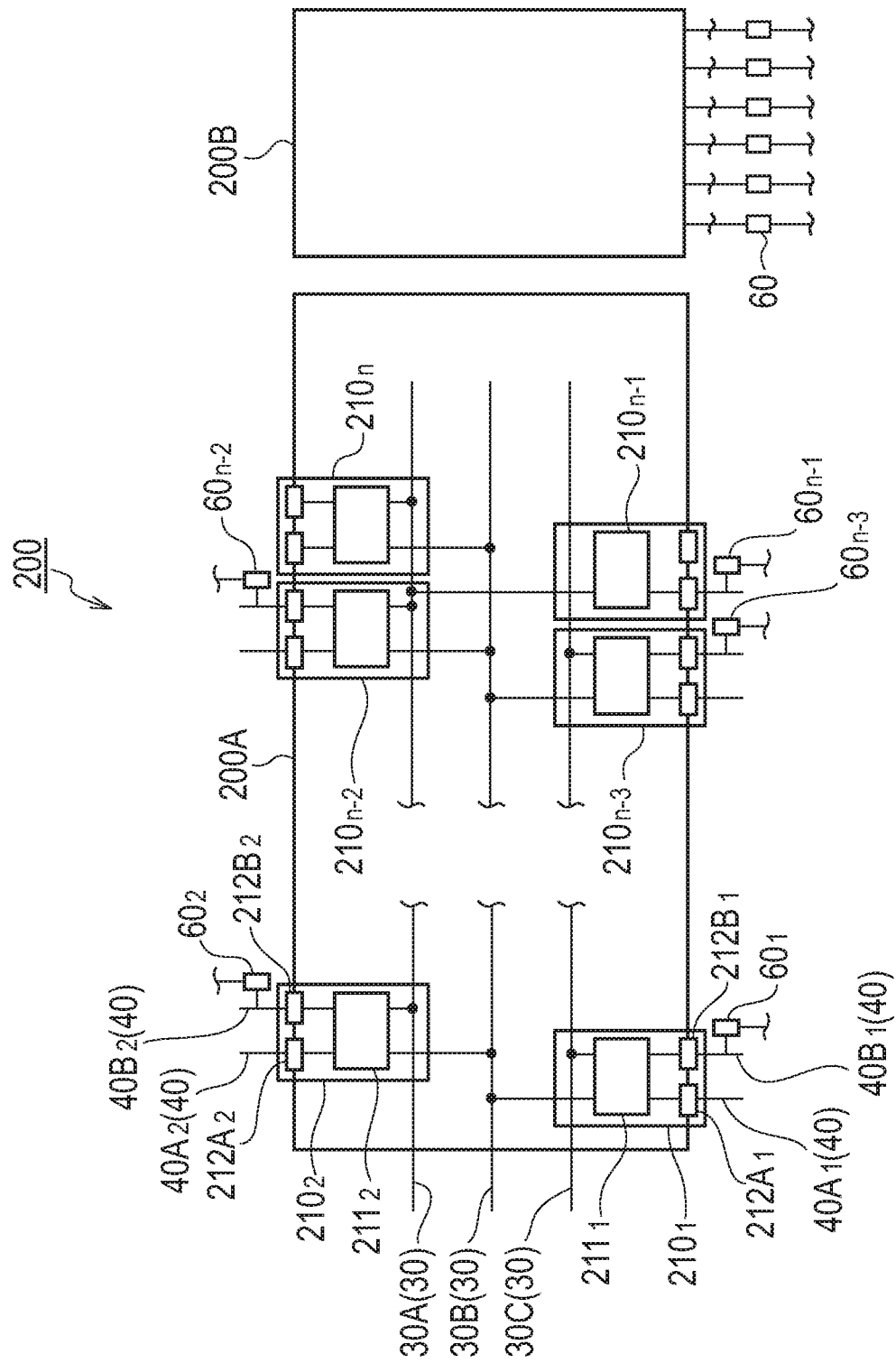
FIG. 2 is a diagram showing a distribution board 200 according to the first embodiment.

The configuration of the distribution board according to the first embodiment will be described, below. FIG. 2 is a diagram showing the distribution board 200 according to the first embodiment.

As shown in FIG. 2, the distribution board 200 has a main body unit 200A and a measurement unit 200B. The main body unit 200A has a configuration in much the same way as in the existing distribution board, for example. The measurement unit 200B is a unit connected newly to the existing distribution board, and has a function of communicating the HEMS 300, for example.

Specifically, the main body unit 200A has a plurality of branching units 210 for branching the grid power line 30 into a plurality of indoor power lines 40. In the first embodiment, n branching units 210 are arranged. In FIG. 2, a subscript (inferior letter) is added to identify each branching unit 210.

Here, the grid power line 30 is configured by a grid power line 30A, a grid power line 30B, and a grid power line 30C. The grid powerline 30 is an example of the upstream power line. The indoor powerline 40 is configured by an indoor power line 40A and an indoor powerline 40B. The indoor power line 40 is an example of the downstream power line.

The branching unit 210 has a breaker 211, a connection terminal 212 (a connection terminal 212A and a connection terminal 212B), and a sensor 60. The breaker 211 is a device for switching ON/OFF of a connection between the grid power line 30 and the indoor power line 40. The connection terminal 212A is a terminal for connecting the indoor power line 40A, and the connection terminal 212B is a terminal for connecting the indoor power line 40B.

For example, in a branching unit 2101, the grid power line 30B is connected to the connection terminal 212A (indoor power line 40A), and the grid power line 30C is connected to the connection terminal 212B (indoor power line 40B). On the other hand, in a branching unit 2102, the grid power line 30A is connected to the connection terminal 212A (indoor power line 40A), and the grid power line 30B is connected to the connection terminal 212B (indoor power line 40B).

The two indoor power lines 40 obtained by being branched byte branching unit 2101 or the branching unit 2102 are connected to the load 120. On the other hand, the distributed power source such as the PV unit 130 requires three indoor power lines 40. Therefore, the three indoor power lines 40 obtained by being branched by a branching unit 210n-3 and a branching unit 210n-1 are connected to the distributed power source such as the PV unit 130. In such a case, the indoor power line 40 is not connected to either one of connection terminals (the connection terminal 212B, for example) of the branching unit 210n-1. Further, as in the branching unit 210n, an indoor powerline 40 may not be connected.

In the first embodiment, each branching unit 210 is connected with the sensor 60 that detects a current flowing through the indoor power line 40B and notifies the measurement unit 200B of the detected current. As shown in FIG. 2, the sensor 60 preferably is connected for each branching unit 210 to which the indoor power line 40 is connected. However, one sensor 60 may be connected to a plurality of branching units 210.

The measurement unit 200B is connected with the sensor 60 connected to the indoor power line 40, and measures the current flowing through the indoor power line 40B via the sensor 60. The measurement unit 200B calculates a power value on the basis of the measured current value and voltage of the indoor power line 40B. The measurement unit 200B has a function of communicating with the HEMS 300, as described above, and transmits the current value or a power value measured by the measurement unit 200B, to the HEMS300.

(Function of Distribution Board)

Figure 3:
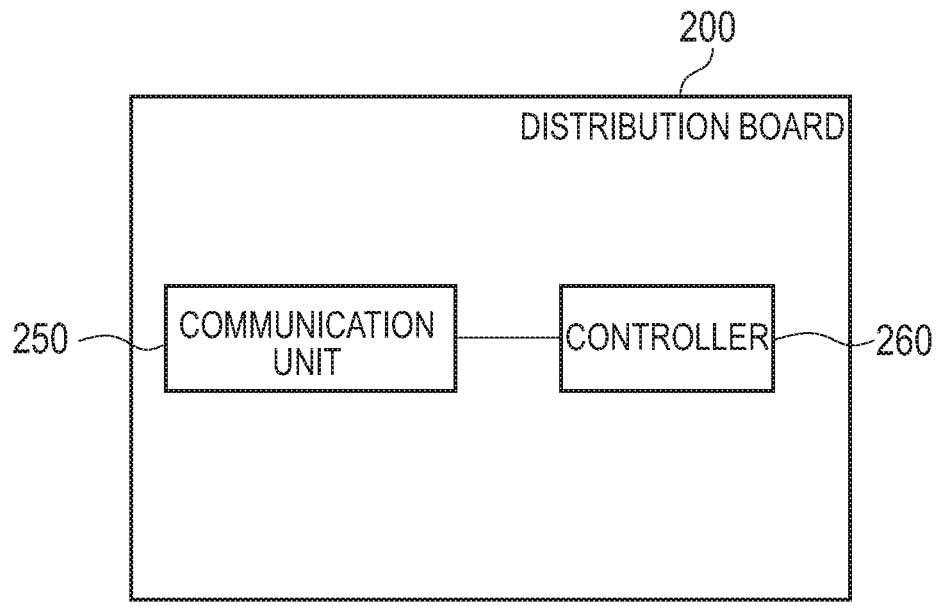
FIG. 3 is a block diagram showing the distribution board 200 according to the first embodiment.

A function of the distribution board according to the first embodiment will be described, below. FIG. 3 is a block diagram showing the distribution board 200 according to the first embodiment.

As shown in FIG. 3, the distribution board 200 has a communication unit 250 and a controller 260. The communication unit 250 and the controller 260 are provided in the measurement unit 200B.

The communication unit 250 is a module that performs communication with the HEMS 300, via an indoor communication network (a narrow area communication network, for example). For example, the communication performed via the indoor communication network complies with ECHONET Lite standards. In the first embodiment, the communication unit 250 configures a transmission unit that transmits the branch information that is information on the plurality of branching units 210 and a receiver that receives a control signal.

In the first embodiment, the branch information is information as shown below, for example.

(A) The branch information is information indicating the current value or the power value of the indoor power line 40 obtained by being branched by the branch (branching unit 210) in a used condition.

(B) The branch information is information indicating a class of the voltage of the grid power line 30 (indoor power line 40). For example, the branch information is information indicating whether 100V or 200V.

(C) The branch information is information indicating a rating capacity (20A and 40A, for example) set to the distribution board 200.

(D) The branch information is information indicating the grid power line 30 to which the indoor power line 40 obtained by being branched by the branch (branching unit 210) is connected. For example, as shown in FIG. 2, when the grid power line 30 is configured by a three-phase power line, the branch information is information indicating either one of the grid power line 30A and the grid power line 30C is branched where the grid power line 30B is regarded as a neutral line.

(E) The branch information is information indicating the number of the plurality of branching units 210 (in a case shown in FIG. 2, the number is n).

(F) The branch information is information indicating the number of branching units 210 in a used condition, out of the plurality of branching units 210.

(G) The branch information is information indicating the branching unit 210 in a used condition (identification information assigned to the branching unit 210, for example).

(H) The branch information is information indicating the branching unit 210 in a non-used condition (identification information assigned to the branching unit 210, for example).

(I) The branch information is information indicating whether there is the branching unit 210 that branches the grid power line 30 into the indoor power line 40 connected to the distributed power source (the PV unit 130, for example).

(J) The branch information is information (identification information assigned to the branching unit 210, for example) indicating the branching unit 210 that branches the grid power line 30 to the indoor power line 40 connected to the distributed power source, out of the plurality of branching units 210. For example, in a case shown in FIG. 2, the branch information is information indicating the branching unit 210n-3 and the branching unit 210n-1.

In the first embodiment, a case where the branching unit 210 is in a non-used condition may include a case shown below, for example.

(A) A case where the breaker 211 is not attached to the branching unit 210.

(B) A case where the indoor power line 40 is not attached to the connection terminal 212.

(C) A case where the connection between the grid power line 30 and the indoor power line 40 is turned OFF by the breaker 211.

(D) A case where the voltage value of the indoor power line 40 is 0 V.

It is noted that in the case (A), a sensor (a mechanical switch, for example) that detects whether or not the breaker 211 is attached to the branching unit 210 is provided in the branching unit 210. In the case (B), a sensor (a mechanical switch, for example) that detects whether or not the indoor power line 40 is attached to the connection terminal 212 is provided in the branching unit 210. In the case (C), a sensor (a mechanical switch, for example) that detects ON/OFF (ON/OFF of the breaker 211) of the connection between the grid powerline 30 and the indoor power line 40 is provided in the branching unit 210. In the case (D), it may suffice that the above-described sensor 60 has a function of detecting the voltage of the indoor power line 40.

In the first embodiment, the communication unit 250 preferably transmits the branch information at a timing at which power is restored from a power failure, at a timing of an initial activation after completion of an installation work, or at a timing immediately after occurrence of a reset process.

Further, the communication unit 250 preferably transmits the branch information at a timing at which the grid power line 30B is disconnected (that is, at a timing at which the power failure occurs). In such a case, for all the branching units 210, the branch information preferably includes information indicating whether or not the branching unit 210 is in a non-used condition. The branch information may include information indicating the number of the plurality of branching units 210. Likewise, the branch information may include information indicating the branching unit 210 that branches the grid power line 30 to the indoor power line 40 connected to the distributed power source, out of the plurality of branching units 210.

Alternatively, when the indoor power line 40 is disconnected, the communication unit 250 preferably transmits, as the branch information, information indicating the branching unit 210 that branches the grid power line 30 to the disconnected indoor power line 40. That is, the communication unit 250 transmits, as the branch information, information indicating that the branching unit 210 that branches the grid power line 30 to the disconnected indoor power line 40 is in a non-used condition.

Alternatively, when the indoor power line 40 is connected, the communication unit 250 preferably transmits, as the branch information, information indicating the branching unit 210 that branches the grid power line 30 to the connected indoor power line 40. That is, the communication unit 250 transmits, as the branch information, information indicating that the branching unit 210 that branches the grid power line 30 to the connected indoor power line 40 is in a used condition.

The controller 260 controls the distribution board 200. For example, the controller 260 controls the above-described breaker 211 in response to the control signal received from the HEMS 300 so as to switch ON/OFF of the connection between the grid power line 30 and the indoor power line 40.

(Function of Control Device)

Figure 4:
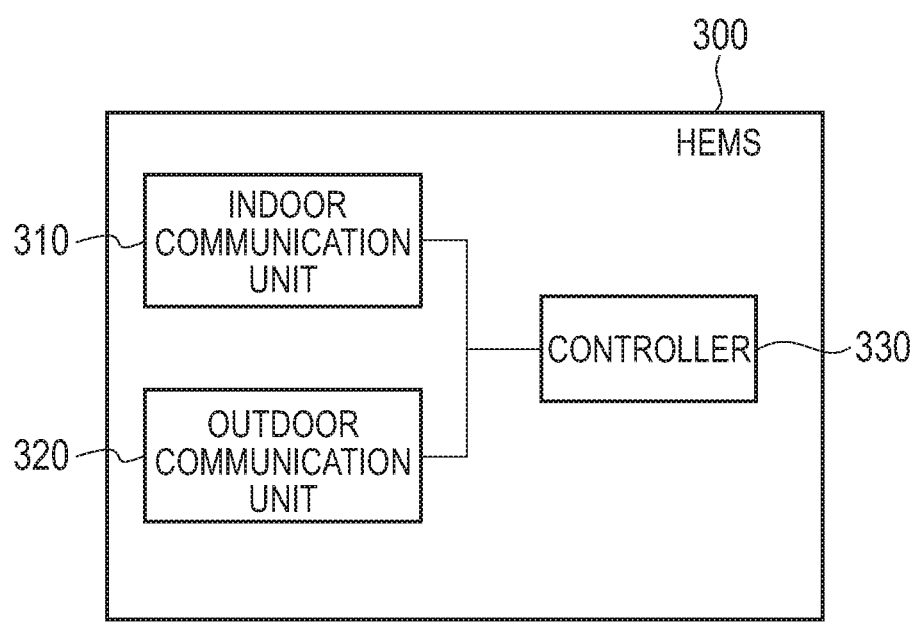
FIG. 4 is a block diagram showing HEMS 300 according to the first embodiment.

The function of the control device according to the first embodiment will be described, below. FIG. 4 is a block diagram showing the HEMS 300 according to the first embodiment.

As shown in FIG. 4, the HEMS 300 has an indoor communication unit 310, an outdoor communication unit 320, and a controller 330.

The indoor communication unit 310 performs communication with various types of devices, via an indoor communication network (an arrow area communication network, for example). For example, the communication performed via the indoor communication network complies with ECHONET Lite standards.

Specifically, the indoor communication unit 310 transmits, to the load 120, the PV unit 130, the storage battery unit 140, the fuel cell unit 150, and the hot-water storage unit 160, a signal for controlling these pieces of equipment. The indoor communication unit 310 receives, from the load 120, the PV unit 130, the storage battery unit 140, the fuel cell unit 150, and the hot-water storage unit 160, information included in these pieces of equipment. For example, the indoor communication unit 310 receives information indicating the amount of power generated by the PV 131, information indicating the amount of power to be stored in the storage battery 141, information indicating the amount of power generated by the fuel cell 151, and information indicating the amount of hot water to be stored in the hot-water storage unit 160.

The indoor communication unit 310 may transmit to the communication terminal 400 information to be collected from each equipment. For example, the indoor communication unit 310 transmits the branch information to the communication terminal 400. The indoor communication unit 310 may receive from the communication terminal 400 information for controlling each equipment. For example, the indoor communication unit 310 may receive a signal for instructing a disconnection/connection of the indoor power line 40 connected to the branching unit 210.

In the first embodiment, the indoor communication unit 310 transmits the control signals to the distribution board 200. For example, the indoor communication unit 310 transmits to the distribution board 200 a control signal for requesting a transmission of the current value of the indoor power line 40 obtained by being branched by the branching unit 210 in a used condition. Alternatively, the indoor communication unit 310 transmits to the distribution board 200a control signal for requesting a disconnection of the indoor power line 40 connected to the branching unit 210 in a used condition. Alternatively, the indoor communication unit 310 transmits to the distribution board 200 a control signal for requesting a connection of the indoor powerline 40 connected to the branching unit 210 in a non-used condition.

The outdoor communication unit 320 performs communication with various types of devices, via an outdoor communication network (a wide area communication network and a mobile communication network, for example). The outdoor communication unit 320 receives, from the various types of servers, for example, the energy rate information, the energy consumption prediction information, and the PV-power-generation amount prediction information. However, the energy rate information, the energy consumption prediction information, and the PV-power-generation amount prediction information may be stored in advance in the HEMS 300.

The controller 330 controls the operation of the HEMS 300. Further; the controller 330 controls the load 120, the PV unit 130, the storage battery unit 140, the fuel cell unit 150, and the hot-water storage unit 160.

In the first embodiment, the controller 330 requests the distribution board 200 to transmit the current value or the power value of the indoor power line 40 obtained by being branched by the branching unit 210 in a used condition. That is, the controller 330 does not request the distribution board 200 to transmit the current value or the power value of the indoor power line 40 obtained by being branched by the branching unit 210 in a non-used condition. Alternatively, the controller 330 requests the distribution board 200 to disconnect the indoor power line 40 connected to the branching unit 210 in a used condition, in response to the detection of a disconnection trigger. Alternatively, the indoor communication unit 310 requests the distribution board 200 to connect the indoor power line 40 connected to the branching unit 210 in a non-used condition, in response to the detection of a connection trigger.

Although not particularly limited, the controller 330 preferably requests the distribution board 200 to disconnect/connect the indoor power line 40, in response to occurrence of a demand response or occurrence of a power tight condition in a 30-minute demand value, for example. That is, the disconnection trigger is to detect a situation where it is necessary to limit an amount of used power supplied from the grid power line 30 due to a situation of the demand response or the 30-minute demand value. On the other hand, the connection triggers to detect cancellation of the situation where the amount of used power supplied from the grid power line 30 is limited. Alternatively, the disconnection trigger and the connection trigger may be an instruction to the HEMS 300 from the communication terminal 400 (that is, a user instruction).

(One Example of Message Format)

Figure 5:
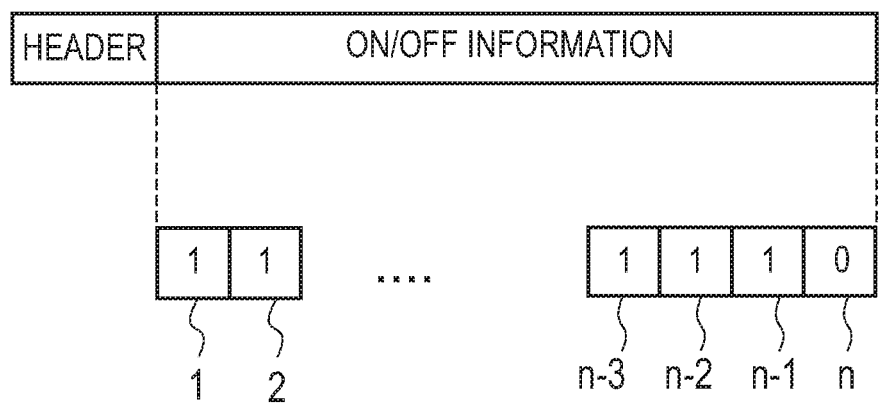
FIG. 5 is a diagram showing an example of a message format according to the first embodiment.
Figure 6:
FIG. 6 is a diagram showing an example of a message format according to the first embodiment.

An example of a message format of the branch information will be described, below. FIG. 5 and FIG. 6 are diagrams showing an example of the message format of the branch information according to the first embodiment. Here, the branch information is information indicating whether or not the branching unit 210 is in a non-used condition, and complies with the ECHONET Lite standards.

As shown in FIG. 5, as an example, the branch information is configured by "header" and "ON/OFF information". The "header" indicates a type of the message. Here, the header is assumed to represent that the "ON/OFF information" indicates whether or not the branching unit 210 is in a non-used condition. The "ON/OFF information" is a bit string configured by bits equal in number to the branching unit 210. "1" indicates that the branching unit 210 is in a used condition, and"0" indicates that the branching unit 210 is in a non-used condition.

In such a case, it is possible to identify each branching unit 210 by the order of bits in the "ON/OFF information", and thus, the branch information does not need to include the identification information for identifying each branching unit 210.

Alternatively, as shown in FIG. 6, the branch information is configured by the "header", "identification information", and the "ON/OFF information". The "header" indicates a type of the message. Here, the header is assumed to represent that the "ON/OFF information" indicates whether or not the branching unit 210 is in anon-used condition. The "identification information" is information by which the branching unit 210 is identified. The "identification information" may indicate a group of branching units 210 when the plurality of branching units 210 are grouped. The "ON/OFF information" indicates whether or not the branching unit 210 identified by the "identification information" is in a non-used condition.

The message format shown in FIG. 5 and the message format shown in FIG. 6 may be used for different purposes in accordance to the need. For example, for all the branching units 210, when it is necessary to notify the HEMS 300 of whether the branching unit 210 is in a non-used condition, the message format shown in FIG. 5 is used. On the other hand, for the individual branching unit 210, when it is necessary to notify the HEMS 300 of whether the branching unit 210 is in a non-used condition, the message format shown in FIG. 6 is used.

In FIG. 5 and FIG. 6, the information indicating whether or not the branching unit 210 is in a non-used condition is described; however, the embodiment is not limited thereto. For example, as a format of a message indicating whether or not the breaker 211 is attached to the branching unit 210, the message format shown in FIG. 5 or FIG. 6 may be used. Alternatively, as a format of a message indicating whether or not the indoor power line 40 is attached to the connection terminal 212, the message format shown in FIG. 5 or FIG. 6 may be used. Alternatively, as a format of a message indicating whether or not the connection between the grid power line 30 and the indoor power line 40 is turned OFF by the breaker 211, the message format shown in FIG. 5 or FIG. 6 may be used.

Further, the message format shown in FIG. 5 or FIG. 6 may be used as a message format of: (A) the branch information indicating the current value or the power value of the indoor power line 40 obtained by being branched by the branch (branching unit 210) in a used condition; (D) the branch information indicating the grid power line 30 to which the indoor power line 40 obtained by being branched by the branch (branching unit 210) is connected; (E) the branch information indicating the number of the plurality of branching units 210 (in a case shown in FIG. 2, the number is n); (G) the branch information indicating the branching unit 210 in a used condition; (H) the branch information indicating the branching unit 210 in a non-used condition; and (J) the branch information indicating the branching unit 210 that branches the grid power line 30 to the indoor power line 40 connected to the distributed power source, out of the plurality of branching units 210.

(Control Method)

Figure 7:
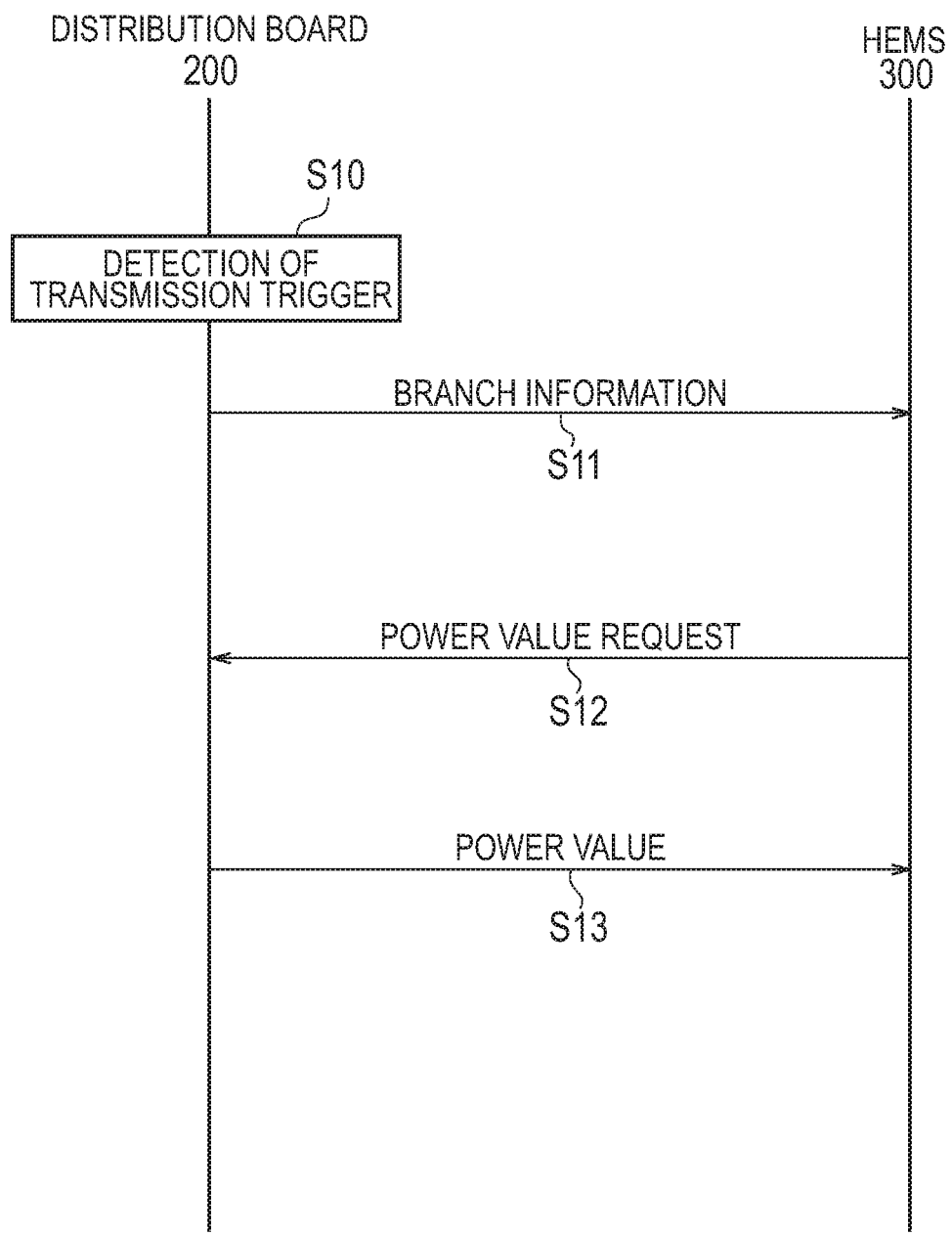
FIG. 7 is a sequence diagram showing a control method according to the first embodiment.
Figure 8:
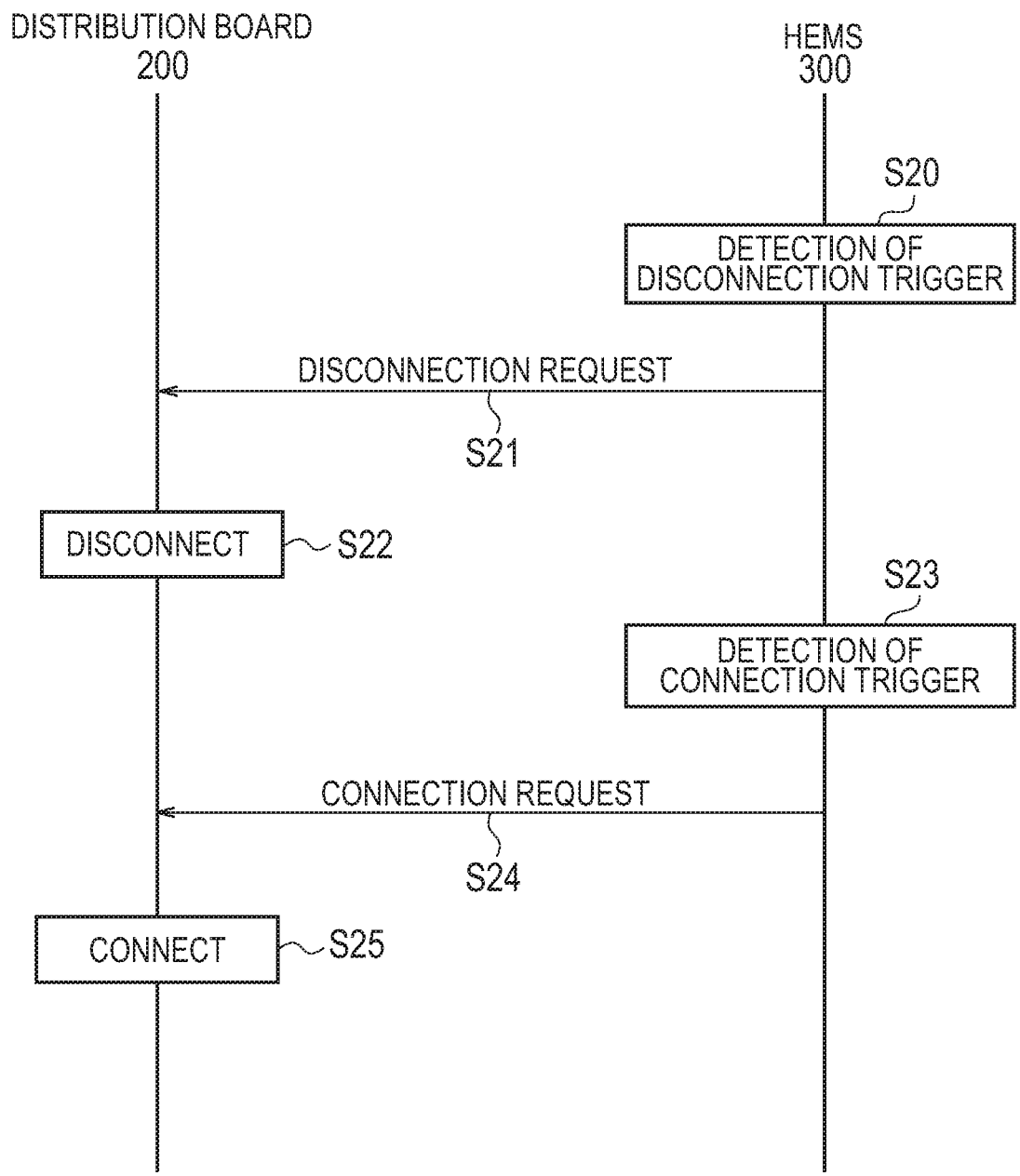
FIG. 8 is a sequence diagram showing a control method according to the first embodiment.

A control method according to the first embodiment will be described, below. FIG. 7 and FIG. 8 are sequence diagrams showing the control method according to the first embodiment.

Firstly, a process of requesting the power value will be described. As shown in FIG. 7, in step S10, the distribution board 200 detects a transmission trigger. The transmission trigger is: a recovery from a power failure, a disconnection of the grid power line 30B (occurrence of a power failure, for example), a disconnection of the indoor power line 40, and a connection of the indoor power line 40.

In step S11, the distribution board 200 transmits the branch information to the HEMS 300. The branch information is information indicating the branching unit 210 in a used condition, out of the plurality of branching units 210, as described above. Alternatively, the branch information may be information indicating the branching unit 210 in anon-used condition, out of the plurality of branching units 210.

In step S12, the HEMS 300 transmits a power value request to the distribution board 200. Specifically, the power value request is a control signal of a predetermined message format having information (ID, etc., to be assigned to the branching unit 210) for designating the branching unit 210 corresponding the indoor power line 40 that needs a power value, out of the branching units 210 which are determined to be in a used condition, and information for requesting transmission of the power value of the indoor power line 40 of the designated branching unit 210. That is, the HEMS 300 requests the distribution board 200 to transmit the power value of the required indoor power line 40, out of the branching units 210 in a used condition.

In step S13, the distribution board 200 transmits to the HEMS300 the power value of the indoor power line 40 of the designated branching unit, requested by the power value request, by generating response signal that complies with a predetermined message format.

Secondly, a process of disconnecting/connecting the indoor power line 40 will be described. As shown in FIG. 8, in step S20, the HEMS 300 detects a disconnection trigger. The disconnection triggers to detect a situation where an amount of used power supplied from the grid power line 30 is limited due to occurrence of the demand response, occurrence of a tight condition in the 30-minute demand value, or the like. The disconnection trigger may be an instruction to the HEMS 300 from the communication terminal 400 (that is, a user instruction). At this time, it is desired to previously acquire the branch information in the distribution board 200 in accordance with the procedures shown in FIG. 7.

In step S21, the HEMS 300 transmits a disconnection request to the distribution board 200. The disconnection request is generated in compliance with a predetermined message format, and is a control signal for requesting a disconnection of the indoor power line 40 connected to the branching unit 210 in a used condition. That is, the HEMS 300 requests the distribution board 200 to disconnect the indoor power line 40 connected to the branching unit 210 in a used condition. At this time, the HEMS 300 may designate the branching unit 210 that should be disconnected on the basis of the previously acquired branch information, and include an ID (identification information) of the designated branching unit 210.

In step S22, the distribution board 200 disconnects the indoor power line 40 requested by the disconnection request. For example, the distribution board 200 disconnects the indoor power line 40 by control of the breaker 211. In particular, when the ID, etc., of the branching unit 210 that should be disconnected is included in the control signal, the distribution board 200 disconnects the indoor powerline 40 by controlling the breaker 211 of the corresponding branching unit 210.

In step S23, the HEMS 300 detects a connection trigger. The connection trigger is to detect cancellation of the situation where the amount of used power supplied from the grid power line 30 is limited. The connection trigger may be an instruction to the HEMS 300 from the communication terminal 400 (that is, a user instruction).

In step S24, the HEMS 300 transmits a connection request to the distribution board 200. The connection request is a control signal for requesting a connection of the indoor power line 40 connected to the branching unit 210 in a non-used condition. That is, the HEMS 300 designates the branching unit 210 in a non-used condition, and requests the distribution board 200 to connect the indoor power line 40 connected to the branching unit 210. Alternatively, the HEMS 300 may include the ID, etc., of the branching unit 210 that is to be disconnected in step S21, into the control signal for requesting a connection, so as to designate the branching unit 210 corresponding the indoor power line 40 requested to be connected.

In step S25, the distribution board 200 connects the indoor power line 40 requested by the connection request. For example, the distribution board 200 connects the indoor power line 40 by control of the breaker 211. In particular, when the ID, etc., of the branching unit 210 that should be connected is included in the control signal, the distribution board 200 connects the indoor power line 40 by controlling the breaker 211 of the corresponding branching unit 210.

As described above, as a result of receiving from the distribution board 200 the branch information that is information on the plurality of branching units 210, and thus, the HEMS 300 is capable of comprehending a state of the distribution board 200 according to the branch information. Thus, it is possible to present the state of the distribution board 200 to a user. Alternatively, it is possible to manage appropriately the power in the consumer's facility 10. In this way, it is possible to further improve the accuracy for a power management through a mutual cooperation upon managing the power by controlling an equipment.

Other Embodiments

The present invention is explained through the above-described embodiments, but it must not be understood that this invention is limited by the statements and the drawings constituting a part of this disclosure. From this disclosure, various alternative embodiments, examples, and operational technologies will become apparent to those skilled in the art.

In the embodiment, the communication terminal 400 is connected, via the indoor communication network, to the HEMS 300. However, the embodiment is not limited thereto. The communication terminal 400 may be connected, via an outdoor communication network, to the HEMS 300.

In the embodiment, a case where the communication performed via the indoor communication network is performed in compliance with the ECHONET Lite standards is mainly described. However, the embodiment is not limited thereto. The communication performed via the indoor communication network may comply with another communication protocol.

In the embodiment, a case where the control device is the HEMS 300 is described. However, the embodiment is not limited thereto. The control device may be provided in BEMS (Building Energy Management System), may be provided in FEMS (Factory Energy Management System), and may be provided in SEMS (Store Energy Management System).

It is noted that the entire content of Japanese Patent Application No. 2013-148918 (filed on Jul. 17, 2013) is incorporated herein by reference.

INDUSTRIAL APPLICABILITY

According to the present invention, it is possible to provide a distribution board, a control device, and a control method, with which it is possible to further improve the accuracy for a power management through a mutual cooperation upon managing the power by controlling equipment.

The invention claimed is:

1. A control device that controls power in a consumer's facility, comprising:
a receiver that receives, from a distribution board having a plurality of branch units for branching an upstream power line into a plurality of downstream power lines, branch information indicating a branch unit in a non-used condition among the plurality of branch units in the distribution board, wherein each of the branch units comprises a connection terminal connectable with one of the downstream power lines, and a breaker connectable to the connection terminal, and wherein the non-used condition of a branch unit comprises any one of a condition that the breaker is not attached to the connection terminal or a condition that a downstream power line is not attached to the connection terminal included in the distribution board; and
a controller that controls power in the consumer's facility according to the branch information, wherein the controller requests the distribution board to transmit a power value of a required downstream power line out of the branching units in a used condition.

2. The control device according to claim 1, wherein the branch information is information indicating a class of voltage of the upstream power line.

3. The control device according to claim 1, wherein the branch information is information indicating a rating capacity set to the distribution board.

4. The control device according to claim 1, wherein the upstream power line includes a plurality of power lines, each downstream power line is connected to at least a part of the plurality of power lines, and the branch information is information indicating an upstream power line to which a downstream power line obtained by being branched by each of the branches is connected.

5. The control device according to claim 1, wherein the branch information is information indicating a number of the plurality of branches.

6. The control device according to claim 1, wherein the branch information is information indicating a number of branches in a used condition.

7. The control device according to claim 1, wherein the branch information is information indicating a branch in a used condition.

8. The control device according to claim 1, wherein the branch information is information indicating whether there is a branch that branches an upstream power line into a downstream power line connected to a distributed power source.

9. The control device according to claim 1, wherein the branch information is information indicating a branch that branches the upstream power line into a downstream power line connected to a distributed power source, out of the plurality of branches.

10. The control device according to claim 1, wherein the receiver receives the branch information at a timing at which power is restored from a power failure.

11. The control device according to claim 1, wherein when the upstream power line is disconnected, the receiver receives the branch information indicating that, for all the plurality of branches, the branches are in a non-used condition.

12. The control device according to claim 1, wherein when a downstream power line is disconnected, the receiver receives the branch information indicating that, for a branch that branches the upstream power line into the disconnected downstream power line, the branch is in a non-used condition.

13. The control device according to claim 6, wherein the controller requests the distribution board to transmit a current value or a power value of a downstream power line obtained by being branched by a branch in a used condition.

14. The control device according to claim 6, wherein the controller requests the distribution board to disconnect a downstream power line connected to a branch in a used condition.

15. A distribution board having a plurality of branch units for branching an upstream power line into a plurality of downstream power lines, comprising:
a transmission unit that
transmits branch information to a control device that controls power in a consumer's facility, wherein the branch information indicates a branch unit in a non-used condition among the plurality of branch units in the distribution board, wherein each of the branch units comprises a connection terminal connectable with one of the downstream power lines, and a breaker connectable to the connection terminal, and wherein the non-used condition of a branch unit comprises any one of a condition that the breaker is not attached to the connection terminal or a condition that a downstream power line is not attached to the connection terminal included in the distribution board; and, in response to a request from the control device, transmits a power value of a required downstream power line out of the branching units in a used condition.

16. A control method used in a control system including a distribution board having a plurality of branch units for branching an upstream power line into a plurality of downstream power lines and a control device that controls power in a consumer's facility, comprising:

a step A of transmitting branch information to the control device from the distribution board, wherein the branch information indicates a branch unit in a non-used condition among the plurality of branch units in the distribution board, wherein each of the branch units comprises a connection terminal connectable with one of the downstream power lines, and a breaker connectable to the connection terminal, and wherein the non-used condition of a branch unit comprises any one of a condition that the breaker is not attached to the connection terminal or a condition that a downstream power line is not attached to the connection terminal included in the distribution board; and a step B of controlling, by the control device, power in the consumer's facility according to the branch information, wherein the control device requests the distribution board to transmit a power value of a required downstream power line out of the branching units in a used condition.

17. The control device according to claim 1, wherein the non-used condition further comprises a condition that the breaker is turned off.

18. The control device according to claim 1, wherein the receiver receives the branch information at any one of a timing of an initial activation after completion of an installation work, and a timing immediately after occurrence of a reset process.

19. The control device according to claim 1, further comprising a transmitter configured to transmit a power value request to the distribution board, wherein the power value request comprises:

identification information indicating a branch unit in a used condition corresponding to required downstream power; and information for requesting transmission of the power value of the required downstream power.

* * * * *